(12) United States Patent
Mizuno et al.

(10) Patent No.: US 6,438,444 B1
(45) Date of Patent: *Aug. 20, 2002

(54) NUMERICAL CONTROL SYSTEM AND AN INPUT SETTING METHOD FOR CONTROL SOFTWARE FOR NUMERICAL CONTROL DEVICES

(75) Inventors: Toru Mizuno, Tama; Masahiko Hosokawa; Minoru Nakamura, both of Minamitsuru-gun, all of (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,449
(22) PCT Filed: May 12, 1997
(86) PCT No.: PCT/JP97/01589
 § 371 (c)(1),
 (2), (4) Date: Jan. 9, 1998
(87) PCT Pub. No.: WO97/43702
 PCT Pub. Date: Nov. 20, 1997

(30) Foreign Application Priority Data

May 10, 1996 (JP) .............................................. 8-141046

(51) Int. Cl.$^7$ .............................................. G06F 19/00
(52) U.S. Cl. ........................... 700/169; 700/18; 700/86; 700/181; 700/189; 318/567; 318/568.1; 318/569
(58) Field of Search .................... 700/17–18, 86–87, 700/159, 160, 169, 112, 172, 173, 176, 235–237, 7, 174, 177, 180, 181–185, 189; 318/567, 568.1, 569, 600, 601; 340/855.3, 855.4, 855.5; 365/49, 50, 51, 52, 189.07

(56) References Cited

U.S. PATENT DOCUMENTS

| | | | |
|---|---|---|---|
| 4,459,655 A | | 7/1984 | Willemin ........................ 700/3 |
| 4,794,541 A | | 12/1988 | Kiya ........................... 700/159 |
| 4,901,218 A | * | 2/1990 | Cornwell ........................ 700/2 |
| 4,935,863 A | * | 6/1990 | Caalvas et al. ................. 700/9 |
| 4,956,785 A | * | 9/1990 | Kawamura et al. ......... 700/159 |
| 5,383,110 A | * | 1/1995 | Fujita et al. ................... 700/83 |
| 5,388,051 A | * | 2/1995 | Seki et al. ................... 700/169 |
| 5,450,346 A | | 9/1995 | Krummen et al. ............. 700/11 |
| 5,457,369 A | | 10/1995 | Matsumura et al. ........ 318/569 |
| 5,877,959 A | * | 3/1999 | Kamiyama et al. ......... 700/159 |
| 5,914,880 A | * | 6/1999 | Yashojima et al. ......... 700/159 |
| 5,930,141 A | * | 7/1999 | Kamiyama et al. ......... 700/159 |
| 5,940,301 A | * | 8/1999 | Damman et al. ........... 700/159 |
| 5,946,215 A | * | 8/1999 | Mito .......................... 700/169 |

FOREIGN PATENT DOCUMENTS

| | | |
|---|---|---|
| EP | 0 592 682 A1 | 4/1994 |
| JP | 60-117302 | 6/1985 |
| JP | 62-74557 | 4/1987 |
| JP | 63-100513 | 5/1988 |

OTHER PUBLICATIONS

Communication including European Search Report mailed Dec. 14, 2000.

\* cited by examiner

Primary Examiner—Ramesh Patel
(74) Attorney, Agent, or Firm—Staas & Halsey LLP

(57) ABSTRACT

When a system is activated, a host computer reads modules from an external nonvolatile memory, reconstructs control software for a machine in accordance with a system configuration information storage file, and transfers the control software to a volatile memory of each numerical control device. Various types of modules are stored collectively in the external nonvolatile memory without duplication. In updating the control software, it is necessary only that data be updated for the software modules in the external nonvolatile memory alone.

14 Claims, 9 Drawing Sheets

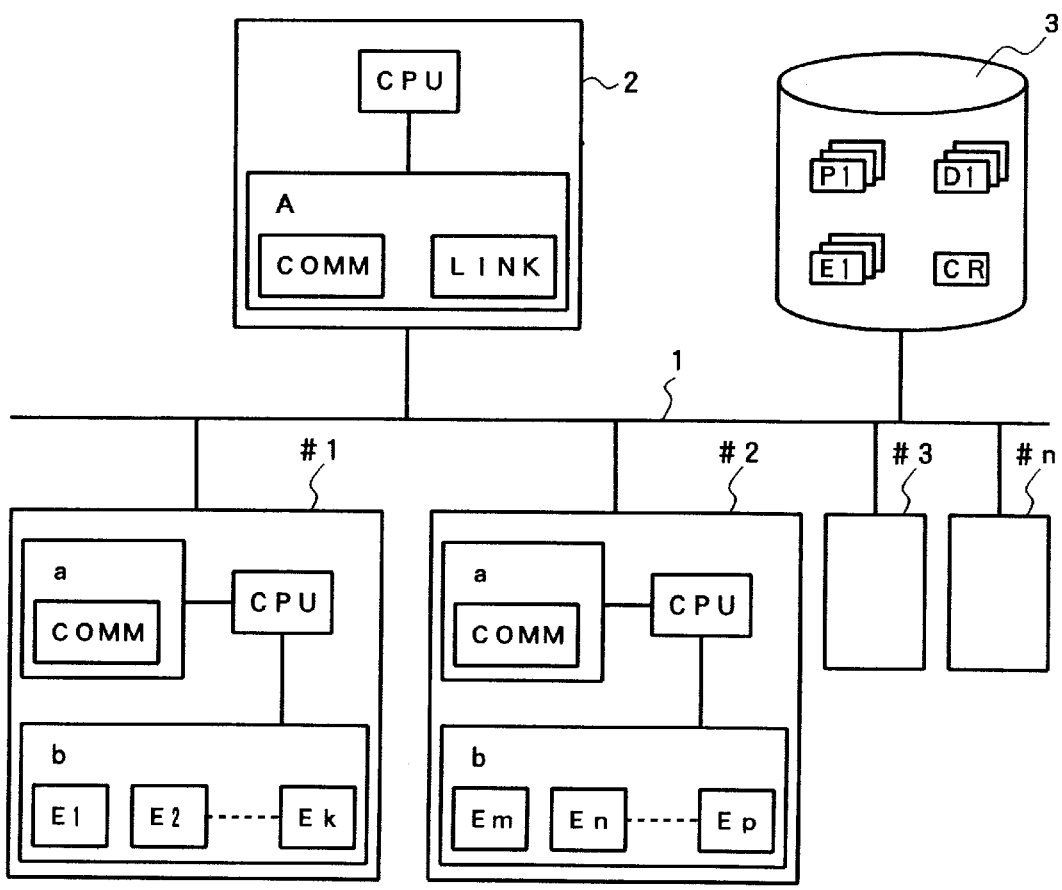

FIG. 8

```
NUMERICAL CONTROL DEVICE  #1 : PROGRAM DECODING      ⟵ CR (MD)
                               E1
                               SERVO COMM
NUMERICAL CONTROL DEVICE  #2 : PROGRAM DECODING
                               E2, E3
                               SERVO COMM
```

FIG. 10

```
AXISRICAL CONTROL DEVICE  #1   AXIS1   E1 a      ⟵ SCD1
                                AXIS2   E1 b
NUMERICAL CONTROL DEVICE  #2   AXIS1   E3 a
                                AXIS2   E3 b
                                AXIS3   E2'
```

FIG. 11

```
NUMERICAL CONTROL DEVICE  #1   AXIS1   A1 (a1)    ⟵ SCD2
                                AXIS2   A2 (a2)
NUMERICAL CONTROL DEVICE  #2   AXIS1   A4 (a4)
                                AXIS2   A5 (a5)
                                AXIS3   A3 (a3)
```

FIG. 12

HARDWARE CONFIGURATION DATA

```
NUMERICAL CONTROL DEVICE   CPU             : 486DX    ⟵ TYPE OF CPU USED
                           MEMORY CAPACITY : 1.2MB    ⟵ SIZE OF MEMORY REGION
NUMERICAL CONTROL DEVICE   CPU             : 486DX2      TO ALLOW MODULE LOADING
                           MEMORY CAPACITY : 0.8MB
```

FIG. 13

DATA ON ADAPTABILITY BETWEEN EACH MODULE AND CONTROL DEVICE

```
        ⋮
E1 : 486DX, 486DX2
E2 : 486DX, 486DX2        ⟵ APPLICABLE CPU TYPE
E3 : 486DX, 486DX2
        ⋮
```

NUMERICAL CONTROL SYSTEM AND AN INPUT SETTING METHOD FOR CONTROL SOFTWARE FOR NUMERICAL CONTROL DEVICES

FIELD OF THE INVENTION

The present invention relates to an apparatus and a method for downloading programs, data, etc. necessary for the operation of numerical control devices from an external memory into the numerical control devices.

DESCRIPTION OF THE RELATED ART

Conventionally known are factory automation systems in which a machine is operated with a plurality of numerical control devices controlled by means of one host computer and factory automation systems in which a plurality of numerical control devices are arranged in one local area network (LAN) and connected to one another, and a plurality of machines can be drivingly controlled for each of the numerical control devices.

Machines that are drivingly controlled by means of numerical control devices include machine tools, such as NC lathes, NC milling machines, etc., and various machines, including motor-operated injection molding machines, industrial robots, etc. In a conventional numerical control device, a series of control software programs for drivingly controlling each machine used to be specialized for each machine and previously stored in a self-perfecting manner in a nonvolatile memory, e.g., a ROM (read-only semiconductor memory), hard disk, etc., in the numerical control device.

In some cases, a plurality of machines of the same type and numerical control devices therefor may be arranged in one local area network. Since machine control software is mounted in each numerical control device, however, updating the software requires software writing operation for each numerical control device despite the sameness in the type of the machines to be drivingly controlled, thus entailing troublesome operation.

With the recent improvement of the functions of numerical control devices, the file sizes of system software for the body of each numerical control device and control software for machines tend to enlarge. However, a user does not always use all functions that are included in the control software, and it is financially wasteful for the user to be forced to increase the storage capacity of the nonvolatile memory in order to mount such control software. In executing the control software, all the control software need not always be read to a volatile memory. As the file size of the control software enlarges, however, the necessary storage capacity of the volatile memory inevitably increases. In the case where only some of the functions of the control software are used, in particular, mounting the excessive-capacity volatile memory entails an economical burden.

If the file size of the control software is enlarged, moreover, another control software cannot be additionally stored in the nonvolatile memory despite the presence of some margin in the nonvolatile memory. If those nonvolatile memories which have extra storage regions remaining therein increase in number on the network, effective use of the nonvolatile memories in the whole system will be hindered.

Actually, a routine for common processing exists between control software programs for different purposes. As mentioned before, however, the conventional control software has a self-perfecting form. If a plurality of control software programs are mounted in the system, therefore, a plurality of routines exist duplicately in the local area network, resulting in a waste of the nonvolatile memories.

According to conventional numerical control devices for machines, moreover, each numerical control device is used corresponding to one or more machines. If any one of the numerical control devices goes wrong, therefore, there is no numerical control device to back it up, so that all the machines that are connected to the faulty numerical control device are disabled.

In the case where each numerical control device is used corresponding to a plurality of machines or their control axes, in particular, excessive load acts on a specific numerical control device, possibly causing a system error or lengthening the operating time. In this case, there is no problem if some of those machines or their control axes which are connected to this numerical control device can be controlled by means of another numerical control device that has a relatively large load to spare. It is difficult, however, to achieve this by a conventional technique, since each of the control software programs mounted in each numerical control device must be thoroughly improved every time overloading or other problem is recognized.

DISCLOSURE OF THE INVENTION

The object of the present invention is to provide a numerical control system, capable of easily updating control software and the like and effectively utilizing resources, such as nonvolatile memories, volatile memories, etc. in the whole system, and an input setting method for control software for numerical control devices in the numerical control system.

In order to achieve the above object, a numerical control system according to the present invention comprises a host computer, a plurality of numerical control devices connected to the host computer by means of an information transmission line, and an external storage device connected to the host computer by means of the information transmission line, each of the numerical control devices including a volatile memory and a nonvolatile memory stored with communication software for information transmission to and reception from the host computer, the host computer including a CPU and a nonvolatile memory stored with communication software, and the host computer having functions to read control software from the external storage device and transfer the control software to the volatile memory of the numerical control device corresponding thereto.

Preferably, the nonvolatile memory of the numerical control device is stored with part of the control program of the numerical control device, besides the communication software, the remaining part of the control program being stored in the external storage device.

Preferably, the external storage device stores the control software in the form of a plurality of modules divided individually for functional elements, and also stores module configuration data for providing information for combining the modules to construct the control software, the host computer is further provided with control software generating software for constructing control software proper to each numerical control device, and the host computer reads the modules from the external storage device in accordance with the control software generating software, constructs control software corresponding to each numerical control device in accordance with the modules, and transfers the control software to the volatile memory of each numerical control device.

Further, an input setting method for control software for numerical control devices according to the present invention comprises (a) connecting one or more numerical control devices and a host computer by means of an information transmission line and loading communication software programs individually into nonvolatile memories in the numerical control device(s) and the host computer, (b) connecting an external nonvolatile memory to the information transmission line, storing the external nonvolatile memory with control software for drivingly controlling a machine by means of the numerical control device(s), and storing a system configuration information storage file indicative of the correlation between the numerical control device(s) and the control software, (c) individually activating the communication software programs when the power supply is connected and transferring the control software corresponding to each numerical control device from the external nonvolatile memory to the host computer through the information transmission line in accordance with the system configuration information software, and storing the control software in the volatile memory of each numerical control device, and (d) causing the numerical control device(s) to analyze a read application program by means of the control software, thereby drivingly controlling each axis of the machine.

Preferably, the control software is composed of two or more software modules, the step (b) includes storing the control software in the form of the software modules in the external nonvolatile memory, and the system configuration information storage file contains information to the effect that the software modules are combined into one control software corresponding to a specific numerical control device.

Preferably, the control software is divided between a first portion required in common for the driving control of various machines without regard to the types of the machines and a second portion, the remainder, associated with the driving control and proper to each individual machine, the first portion of the control software being previously stored in the nonvolatile memory in each numerical control device, the step (b) includes storing the second portion of the control software in the external nonvolatile memory, and the step (c) reading the first portion of the control software from the external nonvolatile memory when the power supply is connected and transferring to and storing the first portion, along with the second portion of the control software stored in the nonvolatile memory of the numerical control device, in the volatile memory of the numerical control device.

Further preferably, the first and second portions of the control software are composed of one or more combinations of software modules each, the nonvolatile memory of the numerical control device and the external nonvolatile memory are stored with the software modules of the first and second portions of the control software, respectively, and the system configuration information storage file contains information to the effect that the software modules are combined into one control software corresponding to a specific numerical control device.

According to the present invention, the machine control software need not be written in the nonvolatile memory of the numerical control device, so that the storage capacity of the nonvolatile memory can be economized.

Since a series of control software programs is reconstructed by combining the divided software modules and loading them into the volatile memory, moreover, it is unnecessary for routines for the same processing to coexist duplicately in the nonvolatile memory in the system, so that the capacity of the nonvolatile memory in the whole system can be economized.

Further, as the software modules are stored collectively in the external nonvolatile memory, in updating the control software, it is necessary only that data be rewritten for the external nonvolatile memory alone, so that updating operation for the control software is simple.

Furthermore, load can be prevented from being concentrated on a specific numerical control device by transplanting the software modules of an overloaded numerical control device to another numerical control device, for example. In case of trouble in any specific numerical control device, moreover, the driving control of the machines can be continued by connecting a spare numerical control device in advance.

BRIEF DESCRIPTION OF THE DRAWINGS

FIG. 1 is a block diagram showing a numerical control system according to one embodiment of the present invention;

FIG. 2 is a conceptual diagram showing an example of module configuration data in a system configuration storage file;

FIG. 8 is a conceptual diagram showing an example of the module configuration data in the system configuration storage file;

FIG. 10 is a conceptual diagram showing an example of axis output information as servo configuration data in the system configuration storage file;

FIG. 11 is a conceptual diagram showing an example of address selection information as servo configuration data in the system configuration storage file;

FIG. 12 is a conceptual diagram showing an example of hardware configuration data in the system configuration storage file;

FIG. 13 is a conceptual diagram showing an example of adaptability data in the system configuration storage file;

DESCRIPTION OF THE PREFERRED EMBODIMENTS

Figure 3:
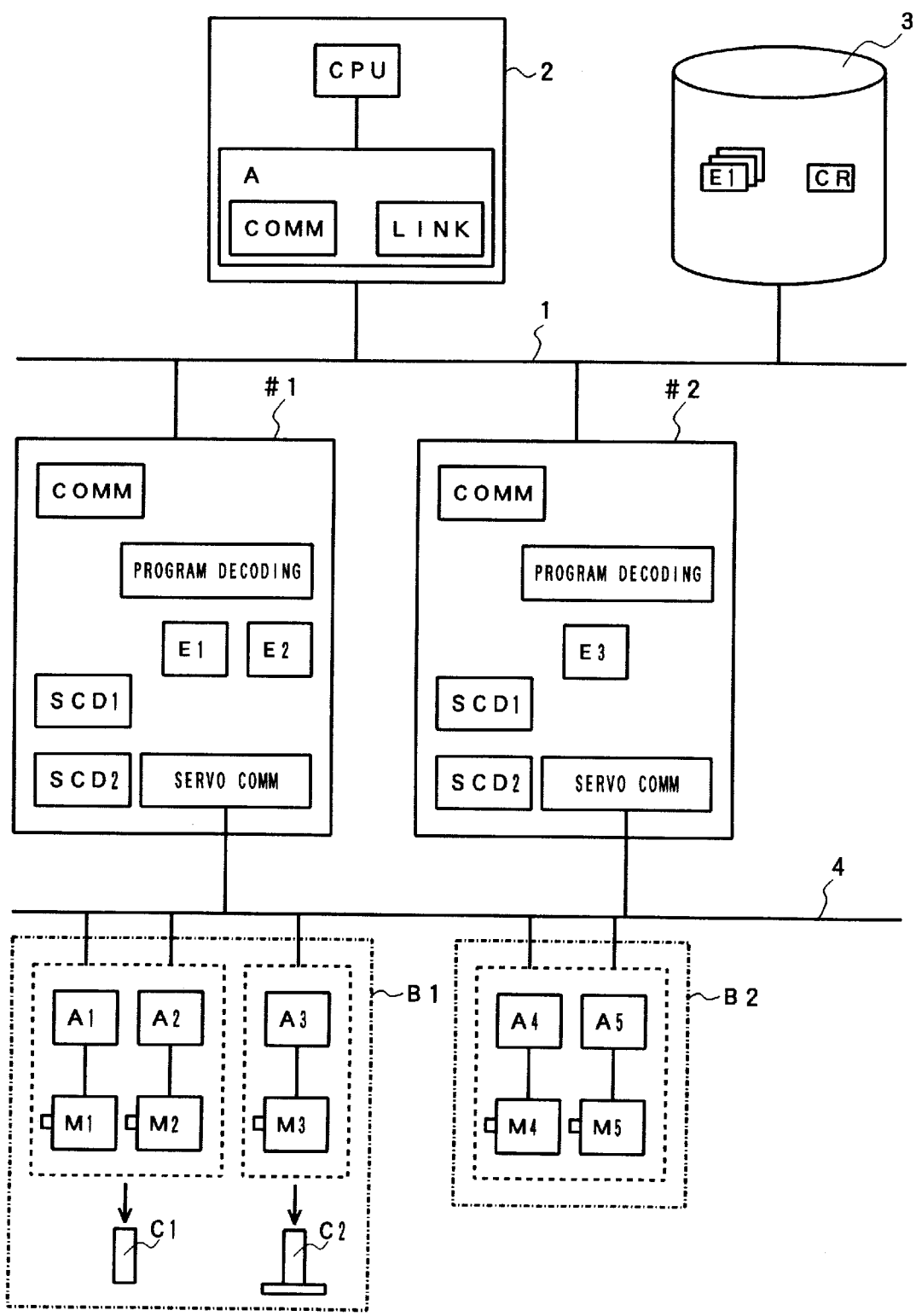
FIG. 3 is a block diagram showing an example of the numerical control system in which a plurality of numerical control devices and a plurality of machine tools are connected by means of a second information transmission line so that load on the numerical control devices can be dispersed.

Referring now to the block diagram of FIG. 1, a system configuration of numerical control devices according to one embodiment of the present invention will be described.

A plurality of numerical control devices #1 to #n are connected to one host computer 2 by means of an information transmission line 1 such as a LAN (local area network). The numerical control devices #1 to #n drivingly control machine tools, such as an NC lathe, NC milling machine, etc., or machines, such as a motor-operated injection molding machine, industrial robot, etc. (not shown). Also, the host computer 2 is connected through bus with an external nonvolatile memory 3 such as a hard disk.

Each of the numerical control devices #1 to #n mounts a CPU (central processing unit) for generally controlling each numerical control device. The CPU is connected with a nonvolatile memory a, formed of a ROM, magnetic disk, or the like, and a volatile memory b, formed of a RAM or the like.

The nonvolatile memory a is loaded with communication software COMM for the transfer of information between the CPU of each numerical control device and the host computer 2, operation software necessary, for example, for activating the CPU, etc. However, the memory a is not loaded with any control software for drivingly controlling the machines.

The machine tools, such as an NC lathe, NC milling machine, etc., or machines, such as a motor-operated injection molding machine, industrial robot, etc., are drivingly controlled by means of control software. This control software is divided into a plurality of divisions for individual functional elements. The divisions of the control software are stored in the form of modules El, E2, E3, . . . in the external nonvolatile memory 3. The functional elements that divide the control software include, for example, a program analyzing function necessary for executing application software programs such as user-generated machining programs, a preprocessing function required for pulse distribution, and an axis control function necessary for driving individual axes of the machine tools.

A control software portion (e.g., module for the program analyzing function or the like) that is required in common for driving control of the various machines without regard to the types of the machines and a module for a control software portion proper to each individual machine are held in the external nonvolatile memory 3. Thus, in the case where the host computer 2 is connected with a large number of numerical control devices, the common module for the machines need not be duplicately stored in the external nonvolatile memory 3. However, this never holds for the case where there are numerical control devices provided with CPUs of different architectures among the numerical control devices that are connected to the host computer 2. Even in the case where the processing functions themselves share an algorithm in common, a plurality of software modules must be stored corresponding individually to the respective CPUs of the numerical control devices of the different architectures.

Further, the external nonvolatile memory 3 is loaded with a file CR which memorizes system configuration information. This file CR is stored with module configuration data MD (i.e., software module elements necessary for the reconstruction of the control software for each numerical control device) for reconstructing each control software, which its required by the machine tools, such as an NC lathe, NC milling machine, etc., motor-operated injection molding machine, industrial robot, etc., by combining the aforesaid software modules, data on the permutation and combination of the software module elements, and addresses (URLs (Uniform Resource Locators)) indicative of the locations of the data. Moreover, the external nonvolatile memory 3 is stored with application software programs P1, P2, P3, . . . , such as user-generated machining programs, and set data D1, D2, D3, . . . , such as parameters stored corresponding to the individual machines.

FIG. 2 shows an example of the module configuration data MD in the system configuration information storage file CR. This example indicates that the control software of the numerical control device #1 is composed of a combination of modules E1, E2, E3, . . . , Ek.

Also, the host computer 2 is mounted with a CPU for generally controlling the host computer 2. This CPU is connected at least with a nonvolatile memory A that is formed of a ROM, magnetic disk, or the like. The nonvolatile memory A is loaded with communication software COMM, which is similar to that of each of the numerical control devices #1 to #n, and control software generating software LINK for successively reading necessary software modules from the external nonvolatile memory 3 with reference to the system configuration information storage file CR, thereby reconstructing control software proper to each of the numerical control devices #1 to #n.

When a system composed of these individual elements is connected to the power supply, the respective communication software programs COMM of the host computer 2 and the numerical control devices #1 to #n and the control software generating software LINK of the host computer 2 are first activated, whereupon each of the numerical control devices #1 to #n gets ready for the input of the control software.

The host computer 2 first starts communication with the external nonvolatile memory 3 in accordance with the control software generating software LINK, and reads information (i.e., required software module elements and data on the permutation and combination of these software module elements) for generating control software corresponding to the machine that is connected to the numerical control device #1, with reference to the module configuration data MD in the system configuration information storage file CR. With reference to the URL that indicates the location of the information, moreover, the host computer 2 successively reads the software module elements for the numerical control device #1 from the external nonvolatile memory 3 in accordance with the permutation and combination of the software module elements. Then, the host computer 2 reads set data, such as parameters stored corresponding to the machine connected to the numerical control device #1, reconstructs control software corresponding to the numerical control device #1, and transfers it to the numerical control device #1. In response to this, the numerical control device #1 stores the transferred control software in the volatile memory b.

Thereafter, the host computer 2 repeatedly execute the same processing as explained above every time the entry of the control software associated with one of the numerical control devices is completed by the aforesaid processing. Thus, the host computer 2 reconstructs the control software by successively reading the software module elements for constructing the control software fit for the machine connected to each numerical control device from the external nonvolatile memory 3, and transfers it to the corresponding numerical control device so that it is stored in the volatile memory b thereof.

The numerical control devices #1 to #n, having control software entered in their respective volatile memories b, read the control software exclusive for the specific machines having previously been stored in the respective ROMs or hard disks of the numerical control devices themselves, and enters it into the volatile memories, thereby obtaining quite the same operating environment as that of conventional numerical control devices with their system activated. Since the very control software for the machines need not be previously written in the respective nonvolatile memories a themselves of the numerical control devices #1 to #n, moreover, the capacities of the nonvolatile memories a of the numerical control devices #1 to #n can be made much more economical than those of the conventional numerical control devices.

In reconstructing the control software for the machines, a user can restrict the elements and number of the software modules to be set in the system configuration information storage file CR for reasons of his own, and hence, to omit unnecessary expanded capability items and the like, for example. Accordingly, those functions which are not required by the user can be prevented from being read as objects of execution by the nonvolatile memories a, so that the capacities of the respective volatile memories b of the numerical control devices #1 to #n can be economized, and the control software of the machines can be customized with ease.

In updating the control software for the machines, the respective nonvolatile memories a of the numerical control devices #1 to #n need not be reloaded for each machine. If the aforementioned processing is carried out after collectively updating the software modules stored in the external nonvolatile memory 3, all the control software programs stored in the respective volatile memories b of the numerical control devices #1 to #n can be updated without exception.

Since the external nonvolatile memory 3 is not loaded with a plurality of the same software modules, it is unnecessary to have a large storage capacity, since the sum total of the file capacities will not become large as compared with the total storage capacity of a conventional nonvolatile memory required for making exclusive-use control software resident in the respective nonvolatile memories a of the numerical control devices #1 to #n.

As for the operation after the completion of the activation of the system, it is carried out in the same manner as the conventional one. The application software programs P1, P2, P3, . . . , such as user-generated machining programs, etc. are read as required from the external nonvolatile memory 3 and loaded into the individual numerical control devices #1 to #n, and are analyzed with use of the control software set in the individual numerical control devices #1 to #n, whereby the individual axes of the machines are drivingly controlled.

The exclusive-use host computer 2 need not always be provided for the reconstruction of the control software. One numerical control device (in place of the host computer 2) may be caused to carry out operation for the reconstruction of the control software with use of the control software generating software LINK previously stored in the nonvolatile memory of the numerical control device.

In the case where the nonvolatile memory a of each numerical control device has a sufficient capacity, the nonvolatile memory a may be previously stored with some of the software modules that constitute the control software portion (e.g., portion for analyzing the application programs or the like) required in common without regard to the types of the machines and the software modules proper to the numerical control device. The time necessary for the activation of the system (the time required for the reconstruction of the control software) can be shortened by transferring other control software programs from the nonvolatile memory a to the volatile memory b the moment these control software programs are entered in the volatile memory b when the power supply is connected.

If the external nonvolatile memory 3 has a storage capacity large enough to allow the same functional portions of the control software to duplicate, the control software need not always be divided into software module units as it is stored in the external nonvolatile memory 3. Thus, a series of control software programs for each machine may be directly stored in advance in the external nonvolatile memory 3 so that they can be immediately transferred to and entered into each numerical control device without being reconstructed by means of the host computer 2.

Referring to FIG. 3, the numerical control devices #1 and #2 and first and second machines B1 and B2 are connected to one another by means of a second information transmission line 4 that is composed of a LAN or the like.

The first machine B1 includes servomotors M1, M2 and M3 corresponding to three axes, individually. The servomotors M1 and M2, among these servomotors, are inseparably combined and drivingly control a tool C1, while the remaining servomotor M3 drivingly controls a tool C2. On the other hand, the second machine B2 includes two servomotors M4 and M5 corresponding to two axes, individually, and drivingly controls one tool in cooperation with each other. Meanwhile, servo amplifiers A1 to A5 have a D/A converter-therein. The servo amplifiers A1 to A5 are drivingly controlled by means of drive commands (torque commands) that are received from the numerical control device #1 or #2 through the second information transmission line 4. Thus, the individual axes of the first and second machines B1 and B2 are drivingly controlled in a dispersed manner by means of the numerical control devices #1 and #2, depending on the load conditions and the like of the respective CPUs of the numerical control devices.

Servo circuits for controlling the servomotors may be provided on the servo amplifier side in a manner such that the servo circuits connected to the servo amplifiers are connected to the second information transmission line 4. In this case, the servomotors M1 to M5 are drivingly controlled by means of movement commands delivered from the numerical control devices #1 and #2 and received by their corresponding servo circuits through the second information transmission line 4.

When the servo amplifiers A1 to A5 are connected to the second information transmission line 4, fixed addresses, e.g., addresses a1 to a5, on the second information transmission line 4 are allotted to them, individually.

The numerical control devices #1 and #2 reads the software modules in the external nonvolatile memory 3 (or software reconstructed by combining the same) through the host computer 2 in the same manner as aforesaid, and stores them as control software for the machines. In FIG. 3 and its subsequent drawings, the nonvolatile memories a and the volatile memories b in the numerical control devices are not shown, and the substantial functional elements alone are illustrated.

In FIG. 3 and its subsequent drawings, a motion control module for two-axis control for the machine B1 is designated by E1, and a motion control module for two-axis control for the machine B2 is designated by E3. Further, a motion control module for one-axis control is designated by E2. Furthermore, a communication software module for information transfer between the numerical control devices #1 and #2 and the servo amplifiers A1 to A5 is represented by SERVO COMM. Naturally, the numerical control devices #1 and #2 also read modules for user program analysis and the like that are common to the individual numerical control devices.

Figure 4:
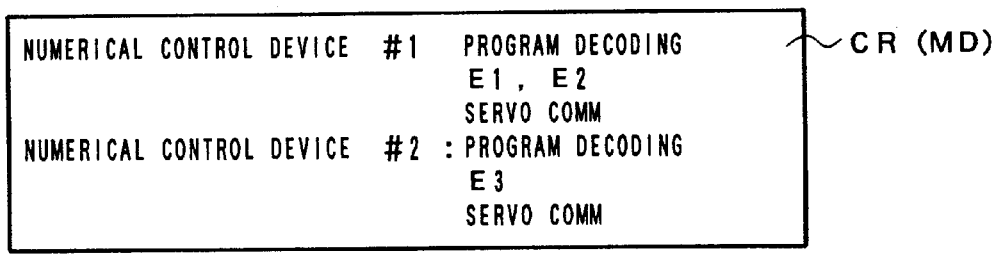
FIG. 4 is a conceptual diagram showing an example of the module configuration data in the system configuration storage file.

FIG. 4 shows conditions for software modules which have been initially read for the numerical control devices #1 and #2, that is, setup conditions for the module configuration data MD in the system configuration information storage file CR.

In the case where the control software is associated with axis control, moreover, it is necessary to provide axis output information SCD1 which indicates correspondences between axes commanded according to a program and axes on the numerical control device side (e.g., information indicative of correspondences between X, Y and Z and first, second and third axes), and address selection information SCD2 for setting a fixed address for output on the second information transmission line 4 to which the axis output on the numerical control device side is to correspond. These servo configuration data (information SCD1 and SCD2) are stored in advance in the system configuration information storage file CR of the external nonvolatile memory 3, and are read, along with the software modules, such as the motion control modules, and user applications, such as SERVO COMM, communication software COMM, machining programs, etc., in the numerical control devices #1 and #2 in a software reading stage.

Figure 5:
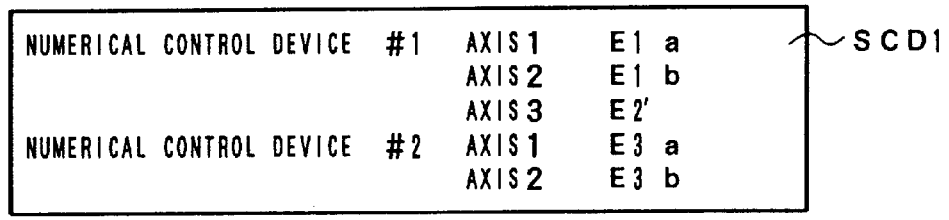
FIG. 5 is a conceptual diagram showing an example of axis output information as servo configuration data in the system configuration storage file.
Figure 6:
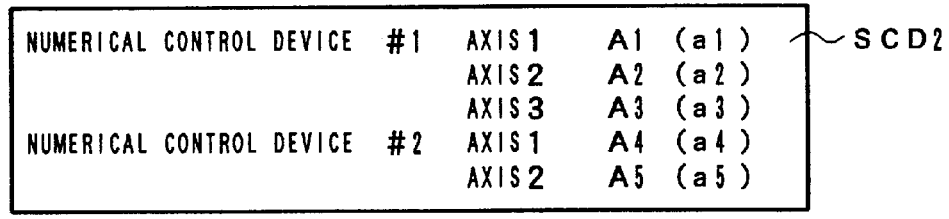
FIG. 6 is a conceptual diagram showing an example of address selection information as servo configuration data in the system configuration storage file.

FIGS. 5 and 6 show examples of the axis output information SCD1 and the address selection information SCD2, respectively, set as the servo configuration data for the numerical control devices #1 and #2 in an initial stage.

On the side of the numerical control device #1, drive commands E1$a$ and E1$b$ for two axes, delivered from the motion control module E1 for two-axis control, are defined as outputs for first and second axes of the numerical control device #1, respectively (see FIG. 5), and moreover, the fixed addresses a1 and a2 on the second information transmission line 4 are selected corresponding to the first and second axes, respectively, of the numerical control device #1 (see FIG. 6). As a result, the servomotors M1 and M2 are drivingly controlled by the motion control module E1 through the servo amplifiers A1 and A2, respectively. Further, a drive command E2' delivered from the motion control module E2 for one-axis control is defined as an output for a third axis of the numerical control device #1 (see FIG. 5), and the fixed address a3 on the second information transmission line 4 is selected corresponding to the third axis of the numerical control device #1 (see FIG. 6). As a result, the servomotors M3 is drivingly controlled by the motion control module E2 through the servo amplifier A3.

Figure 7:
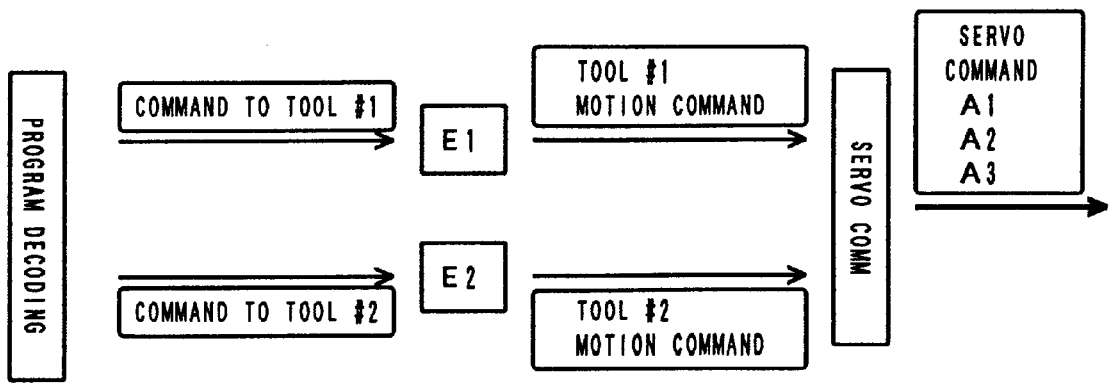
FIG. 7 is a conceptual diagram showing the operation of a software module (servo COMM) for information transfer between the numerical control devices and servo amplifiers for individual axes.

FIG. 7 shows an outline of control of first and second tools #1 and #2 by means of the numerical control device #1. Based on the informations, such as the axis output information SCD1 and the address selection information SCD2, the SERVO COMM controls the input and output of feedback data, such as drive commands, position/speed data, etc., between the numerical control devices and the individual machines.

On the side of the numerical control device #2, moreover, drive commands E3$a$ and E3$b$ for two axes, delivered from the motion control module E3 for two-axis control, are defined as outputs for first and second axes of the numerical control device #2, respectively (see FIG. 5), and moreover, the fixed addresses a4 and a5 on the second information transmission line 4 are selected corresponding to the first and second axes, respectively, of the numerical control device #2 (see FIG. 6). As a result, the servomotors M4 and M5 are drivingly controlled by the motion control module E3 through the servo amplifiers A4 and A5, respectively.

If the machining times for the tool C1 of the machine B1, tool C2, and machine B2 are t1, t2 and t3, respectively, and if the time t3 is the shortest among these times (t1, t2>>t3), the overall machining time is equal to "t1+t2". If the second machine B2 is used to carry out the machining by means of the tool C2, however, the overall machining time is equal to "t1" or "t2+t3", whichever is longer. Thus, the overall machining time can be shortened by (t1+t2)−(t2+t3)=t1−t3.

The following is a description of processing operation for the case where the numerical control device #1 is caused to hand over the driving control of the tool C2 to the numerical control device #2.

As mentioned before, the motion control module E2 for drivingly controlling the tool C2 is composed of an independent software module. Therefore, by reloading the system configuration information storage file CR to make it reread a software module, the motion control module E2 can be transferred from the numerical control device #1 to #2 so that the numerical control device #1 can be caused to hand over the driving control of the tool C2 to #2.

Figure 9:
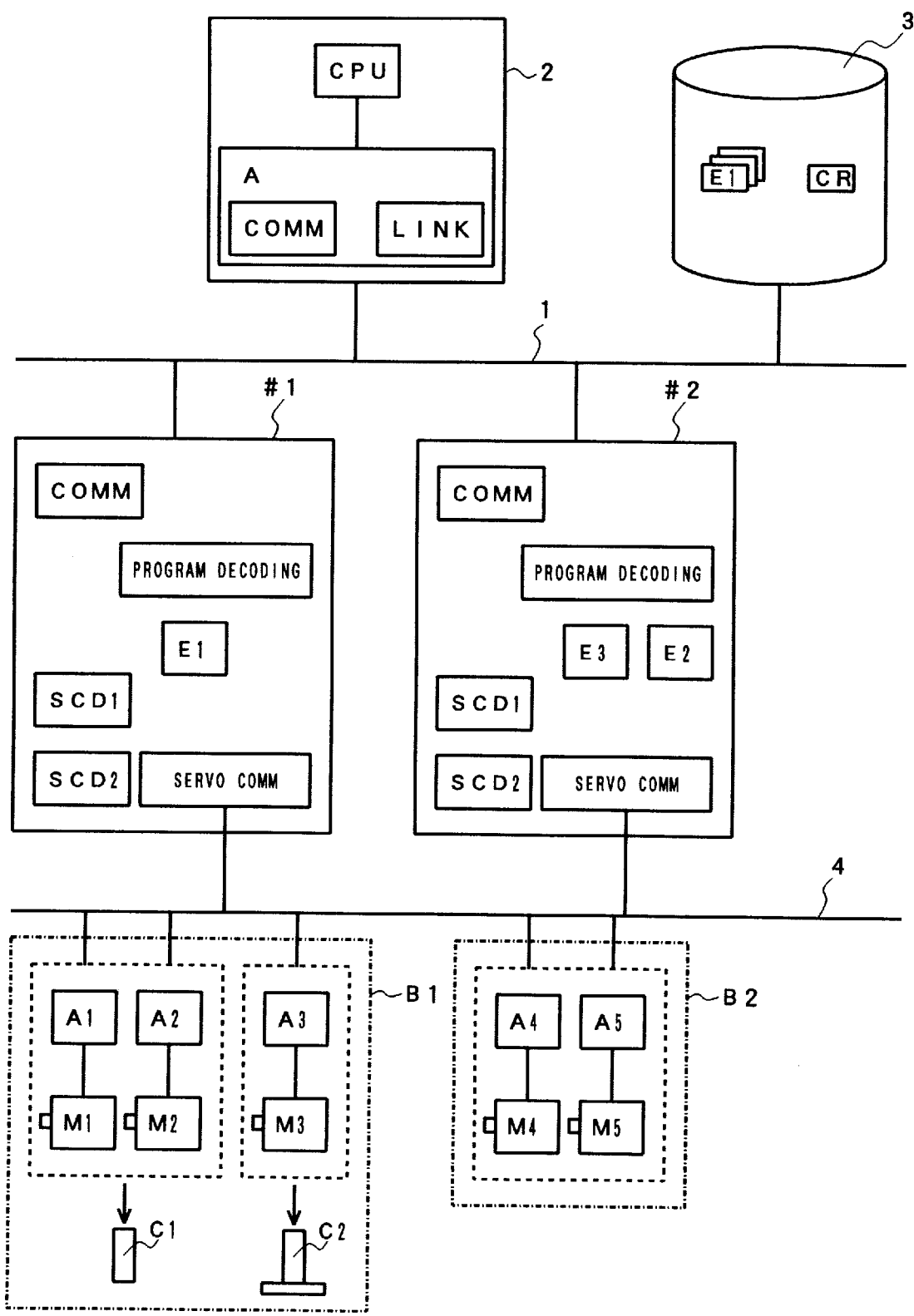
FIG. 9 is a block diagram showing another example of the numerical control system in which a plurality of numerical control devices and a plurality of machine tools are connected by means of the second information transmission line so that load on the numerical control devices can be dispersed.

Thereupon, an operator first rewrites the module configuration data MD in the system configuration information storage file CR in the external nonvolatile memory 3 by keyboard operation through the host computer 2 or the like so that the state shown in FIG. 4 is replaced with the state shown in FIG. 8, and further rewrites the contents of the axis output information SCD1 and the address selection information SCD2 of the servo configuration data so as to establish the states shown in FIGS. 10 and 11. Then, the host computer 2 is caused again to transfer the software modules and servo configuration data to the numerical control device #1 and the numerical control device #2, and at the same time, the application software programs, such as the machining programs, having so far been being executed in the numerical control device #1, are transferred also to the numerical control device #2. In consequence, the motion control module E2 for one-axis control, having so far been mounted in the numerical control device #1, is transferred to the numerical control device #2, as shown in FIG. 9.

In this case, the motion control module E2, having so far been corresponding to the third axis of the numerical control device #1, is withdrawn from the numerical control device #1, so that there is no input or output process corresponding to the third axis of the numerical control device #1. Instead, the drive command from the motion control module E2 is transmitted to the servomotor M3 of the machine B1 by utilizing the axis output corresponding to the third axis of the numerical control device #2 and the fixed address a3 on the second information transmission line 4.

As described above, the drive axis control by means of an excessively loaded numerical control device can be dispersedly assigned to another numerical control device by reloading the system configuration information storage file CR by the operator's manual operation. Alternatively, the load acting on the CPU of the numerical control device #1 may be detected so that the numerical control device #1 can be caused automatically to hand over the driving control of the tool C2 to the numerical control device #2.

Figure 14:
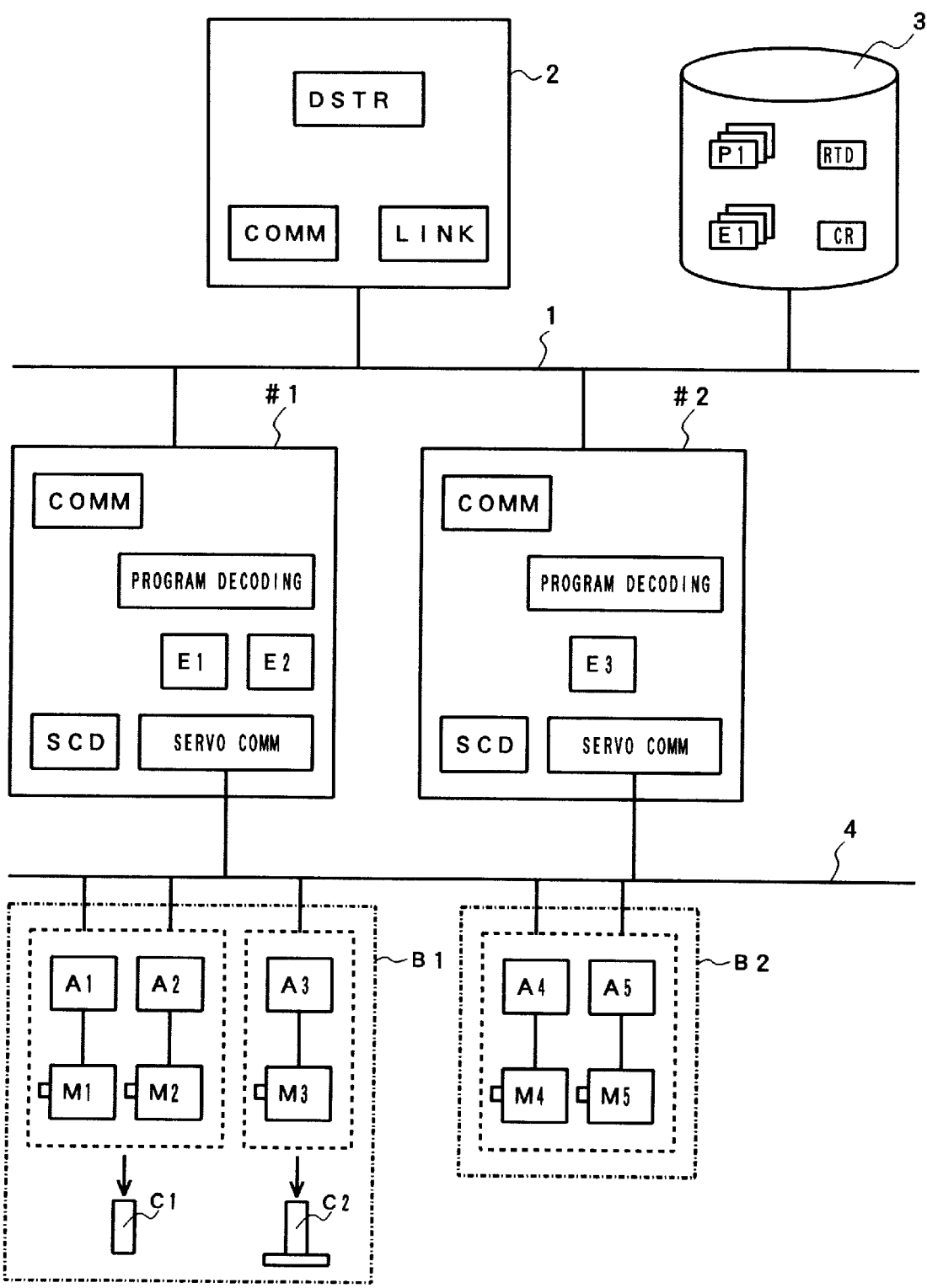
FIG. 14 is a block diagram showing another example of the numerical control system in which a plurality of numerical control devices and a plurality of machine tools are connected by means of the second information transmission line so that load on the numerical control devices can be dispersed.

In this case, it is necessary to store in the system configuration information storage file CR of the external nonvolatile memory 3, in advance, a hardware configuration information file (see FIG. 12) which is loaded with the type of the CPU mounted in each numerical control device or the free capacity of the volatile memory b, adaptability data (see FIG. 13) loaded with the adaptability between the file type of each software module and the architecture of the CPU, etc. Control software DSTR for the automatic handover may be either stored in advance in the host computer 2 (see FIG. 14) or stored in advance in the external nonvolatile memory 3 so that it can be transferred to the host computer 2 when the system is activated.

Figure 15:
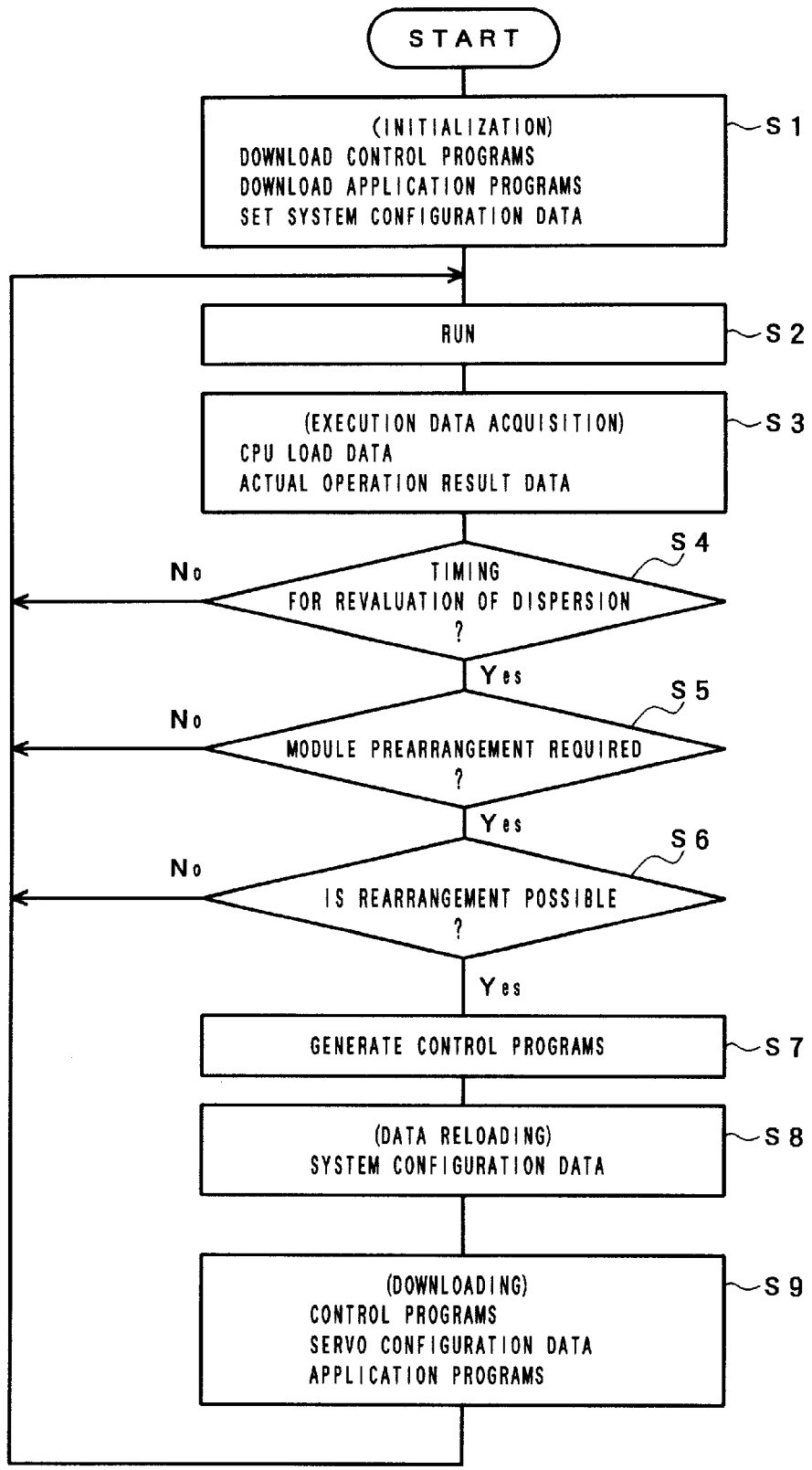
FIG. 15 is a flowchart showing an outline of automatic processing for handing over the driving control of some servomotors to an alternative numerical control device having a sufficient capacity to process.

Referring now to the flowchart of FIG. 15, an outline of automatic processing will be described, in which excessive load acting on the CPU of each numerical control device is detected by means of the host computer 2, and the numerical control device concerned is caused to hand over the driving control of some servomotors as objects of control to another numerical control device having a sufficient capacity.

As mentioned above, the operator first stores in the external nonvolatile memory 3 in advance the system configuration information storage file CR, which contains the set values of the axis output information SCD1 and the address selection information SCD2, according to initial drive conditions, and stores the volatile memory b of each numerical control device with the software modules in the external nonvolatile memory 3, as the control software, in accordance with the data in the system configuration information storage file CR. Further, the operator downloads the application software programs, such as the machining programs, into each numerical control device (Step S1), initiates automatic operations of the host computer 2 and each numerical control device (Step S2), and causes the host computer 2 to start a process for detecting load data and actual operation result data of the CPU of each numerical control device (Step S3).

For example, the running ratio of a task of the lowest priority of the CPU of each numerical control device (the longer the task of the lowest priority runs, the smaller the load acting on the CPU is) can be used as the load data. Further, the relation between the operating time and downtime of the tool of each machine, e.g., the ratio of the operating time to the overall time, can be used as the actual operation result data. Each numerical control device obtains the average value, maximum value, etc. of the load data at every predetermined period, and transfers these values, together with the actual operation result data, to the host computer 2. On the side of the host computer 2, the load data is utilized as a criterion for decision on the necessity of dispersion of the axis control, and the actual operation result data is stored in the external nonvolatile memory 3.

After starting the process for detecting the load data and the actual operation result data, the host computer 2 determines whether or not the time for the revaluation of the necessity of dispersion of the axis control is reached (Step S4). If this time is not reached, the host computer 2 stands by while repeating the process for detecting the load data and the actual operation result data and the process for discriminating the revaluation time. The revaluation time for the necessity of dispersion of the axis control can be discriminated by utilizing the establishment of specific conditions, e.g., change of the control mode such as changeover from two-axis control to three-axis control, as well as timer setup.

When the revaluation time for dispersion is reached as the aforesaid processing is repeatedly executed (Step S4), the host computer 2 retrieves the load data of all the numerical control devices that are connected to the host computer 2, and determines whether or not there is any numerical control device in which a part of the driving control of the servomotors has to be transferred to any other numerical control device, that is, whether or not there is any numerical control device whose CPU load is excessive (Step S5). As mentioned before, the excessiveness of the CPU load can be determined depending on whether or not the load data detected in the process of Step S3, e.g., running ratio of the task of the lowest priority, is lower than a set value.

If any numerical control device whose CPU load is excessive is detected, the host computer 2 then determines whether or not the motion control module for the axis being driven by the excessive-load numerical control device can be remounted in any other numerical control device (Step S6).

This determination process can be executed by the following processing operation, for example.

The host computer 2 first selects a motion control module to be transplanted from the excessively-loaded numerical control device to the alternative numerical control device. If the motion control module that applies excessive load to the CPU is transplanted to the alternative numerical control device, it is natural for the alternative numerical control device to be subjected to excessive load under the same conditions. Therefore, the motion control module that applies excessive load to the CPU is not counted as an object of transplantation. Thus, if the numerical control device #1 is subjected to excessive load in the cases shown in FIGS. 3 and 9, for example, the motion control module E1 is not expected to be transplanted, and the motion control module E2 is selected as an object of transplantation. Since the load on this numerical control device cannot be reduced if an inactive motion control module is selected as the object of transplantation, such a motion control module is not expected to be transplanted either.

After the motion control module as the object of transplantation is thus selected from the overloaded numerical control device, the host computer 2 refers to the adaptability data (see FIG. 13) in the system configuration information storage file CR, and searches for numerical control devices which are provided with CPUs adaptable to the aforesaid motion control module and whose free memories stored in the hardware configuration data (see FIG. 12) of the numerical control device are larger in size than the file of the motion control module. Further, the host computer 2 selects from these numerical control devices, one which is subject to a relatively small load as a destination numerical control device with reference to the aforesaid load data.

In the case where the general processing speed is increased as a specific motion control module is transferred to another numerical control device, moreover, this motion control module is selected as the object of transplantation, and it is determined, in the same manner as mentioned above, whether or not there is any adaptable numerical control device.

If any numerical control device that fulfills the above conditions is detected, the conclusion in Step S6 is Yes. If none is detected, the conclusion is No.

If no conformable numerical control device is detected, the host computer 2 relinquishes the operation for transplanting the motion control module, and returns to the process of Step S2, whereupon it repeats again the processes associated with the detection of the revaluation time for the collection and dispersion of the load data and the actual operation result data, decision on the replaceability of the module, etc. As this is done, the load data, actual operation result data, etc. change diversely. Therefore, if any overloaded numerical control device is detected again, it will be possible for part of the motion control module of this numerical control device to be transplanted to another numerical control device.

If any numerical control device that fulfills the appropriate conditions is detected in the determination process of Step S6, furthermore, the host computer 2 reads again the system configuration information storage file CR for the overloaded numerical control device from the external nonvolatile memory 3, and removes the data of the motion control module as the object of transplantation, e.g., E2, from the software module combination data in the system configuration information storage file CR. Also, the system configuration information storage file CR for the numerical control device selected as the destination is read, and the data of the motion control module E2 as the object of transplantation is written additionally, whereby the axis output information SCD1 and the address selection information SCD2 are updated. Thus, both the system configuration information storage files CR for the overloaded numerical control device and the numerical control device as the destination of transplantation of the motion control module are rewritten. In this manner, the driving control of the servomotor controlled by means of the overloaded numerical control device is transferred to another numerical control device (Step S8).

Based on the two updated system configuration information storage files CR, the numerical control device which has so far been overloaded and the numerical control device selected as the destination of transplantation of the motion control module are caused individually to read the software modules in the same manner as when the system is activated, whereby the motion control modules is transferred (Step S9). Then, the program returns to Step 52, whereupon the drivingly control of each machine is started again.

Figure 16:
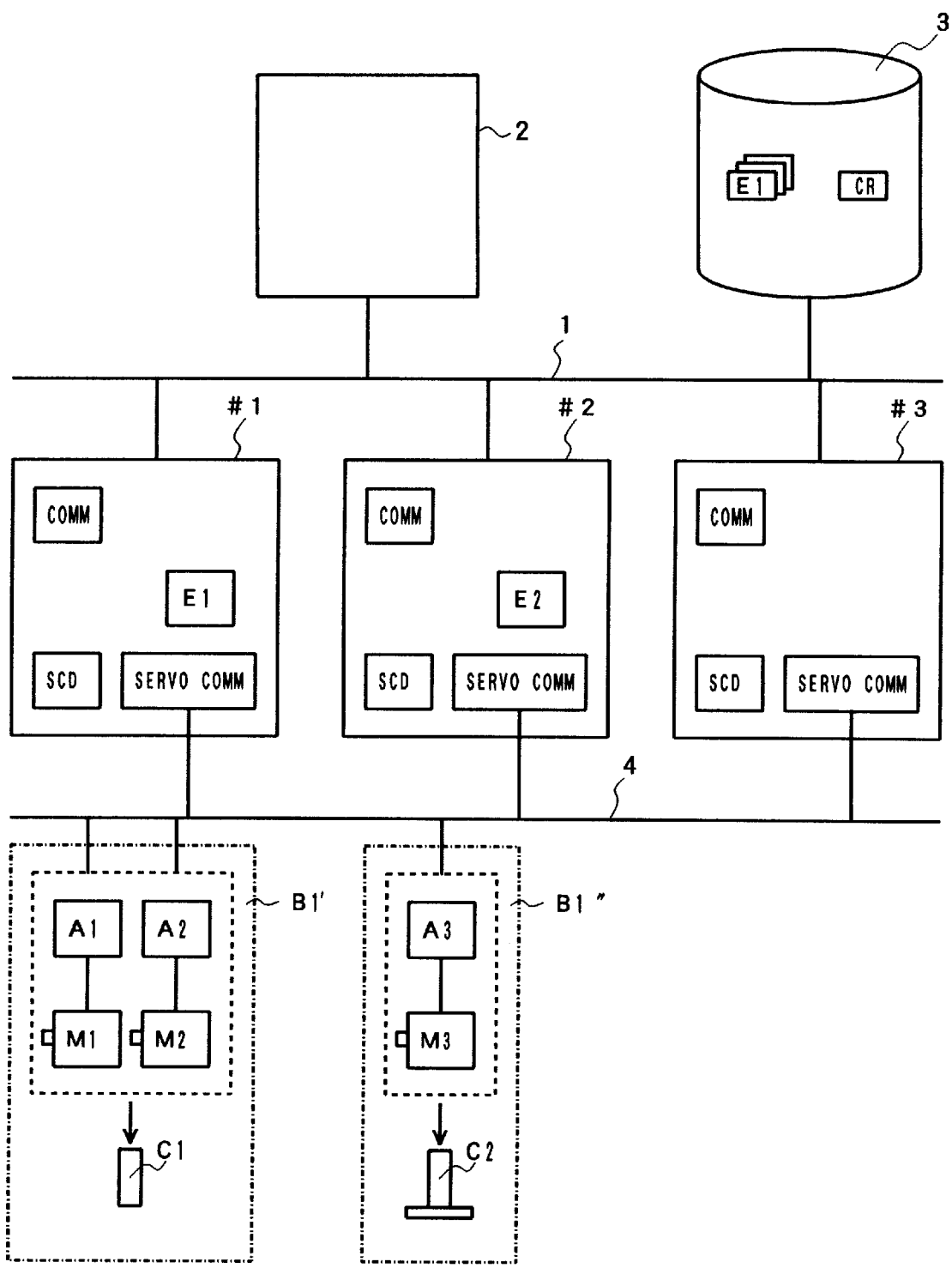
FIG. 16 is a block diagram showing an example of the numerical control system in which a plurality of numerical control devices including a spare device and a plurality of machine tools are connected by means of the second information transmission line so that load on the numerical control devices can be dispersed.

The above is a description of the case where the load on the overloaded numerical control device is reduced by transferring part of the motion control module mounted in the overloaded numerical control device to another numerical control device, according to the one embodiment. As shown in FIG. 16, however, a spare numerical control device #3 that is not concerned directly in the driving control of machines B1' and B1" may be previously connected to the host computer 2 and the individual machines B1' and B1". If the numerical control device #1 for drivingly controlling the machine B1' or the numerical control device #2 for drivingly controlling the machine B1" is subject to any system error or failure, in this case, the driving control of the machine having so far been connected to the faulty numerical control device can be handed over to the spare numerical control device #3 so that the driving control of the machine can be continued as it is.

Naturally, in this case, a CPU which the numerical control device #3 uses is compatible with the numerical control devices #1 and #2. Since a volatile memory in the numerical control device #3 is initially stored with nothing, moreover, it is unnecessary to check the free capacity of the volatile memory to see if the software modules which have so far been mounted in the faulty numerical control device can be reloaded into the numerical control device #3. When the faultiness of the numerical control device #1 or #2 is detected by the host computer 2, all the control software programs are immediately downloaded from the external nonvolatile memory 3 to the numerical control device #3 with reference to data in the system configuration information storage file CR of the numerical control device concluded to be faulty, and the application software programs are also downloaded so that the driving control of the machine which has so far been being driven by the numerical control device concluded to be faulty can be restarted. In the case where the numerical control devices #1 and #2 can return execution information (program number, row number, current position, etc.) of the application programs to the host computer, moreover, the operation of the faulty numerical control device can be continued without interruption.

Further, one numerical control device may be used selectively for the control of a plurality of machines.

Figure 17:
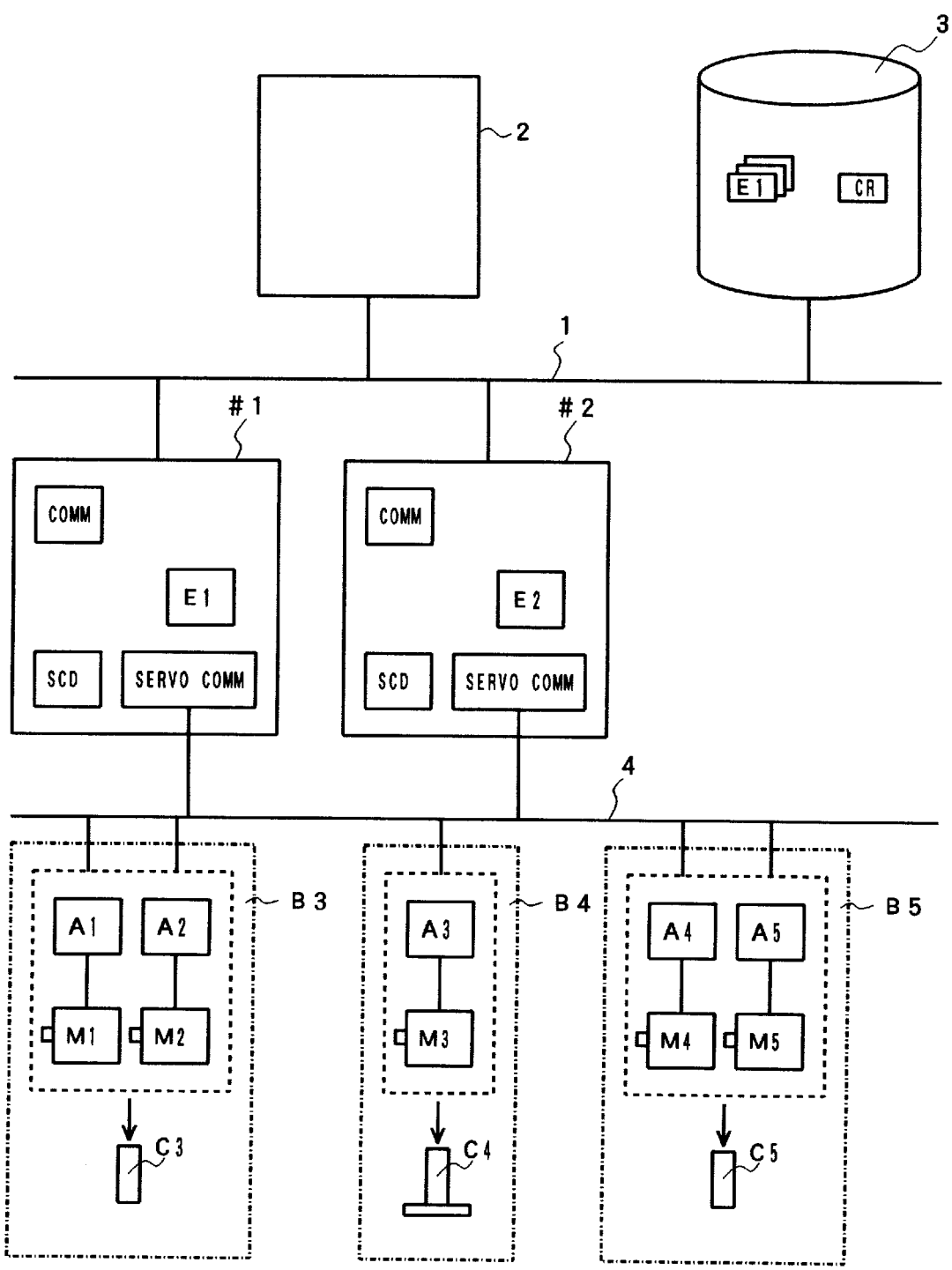
FIG. 17 is a block diagram showing an example of the numerical control system designed such that a plurality of machines are selectively controlled by means of one numerical control device.

If machines B3 and B5 need not operate simultaneously by reason of the machining time, in the case where a workpiece is continuously machined in a system composed of machines B3, B4 and B5, as shown in FIG. 17, for example, the machines B3 and B5 can be controlled by means of one control device. In this case, if the machining times of the machines B3, B4 and B5 are t3, t4 and t5, respectively, and the total machining time (t3+t5) of the machines B3 and B5 is not longer than the machining time t4 of the machine B4 (t3+t5≦t4), and if workpieces machined by means of the machines B3 and B4, individually, are fed to the machines B4 and B5, respectively, the general cycle time for machining is settled depending on the machining time t4 of the machine B4. Thus, one workpiece may be machined by means of the machine B3 under the control of the numerical control device #1 while another workpiece is being machined by means of the machine B4 under the control of the numerical control device #2, and the system, upon completion of this machining, may be switched so as to control the machine B5 by means of the numerical control device #1, whereby still another workpiece can be machined by means of the machine B5.

The numerical control device #2 is downloaded with control software modules (only the motion control module E2 is illustrated for the numerical control device #2 in FIG. 17) for controlling the machine B4 and application software, servo configuration data SCD1 and SCD2, and set data, such as parameters, to be processed in the machine B4. The numerical control device #1 is initially downloaded with control software modules (only the motion control module E1 is illustrated) for controlling the machine B3 and application software, servo configuration data SCD1 and SCD2, and set data, such as parameters, to be processed in the machine B3. Thus, the individual workpieces are machined by means of the machines B3 and B4 under the control of the numerical control devices #1 and #2, respectively.

When the machining by means of the machine B3 under the control of the numerical control device #1 is finished, the host computer 2 downloads the numerical control device #1 with control software modules for controlling the machine B5 and application software, servo configuration data SCD1 and SCD2, and set data, such as parameters, to be processed in the machine B5, thereby switching the system so that the workpiece is machined by means of the machine B5 under the control of the numerical control device #1.

In changing the control software module, common portions need not be changed, and it is necessary only that the motion control software El be changed over to E3 for the machine B5, for example.

In this manner, a plurality of machines can be selectively controlled by means of one numerical control device.

What is claimed is:

1. A numerical control system comprising:
   a host computer;
   a plurality of numerical control devices connected to said host computer; and
   an external storage device connected to said host computer, wherein
   each of said numerical control devices include a volatile memory and a nonvolatile memory stored with communication software for information transmission to and reception from said host computer,
   said host computer including a CPU and a nonvolatile memory stored with communication software, and
   said host computer having functions to read control software, to control one of the numerical control devices, from said external storage device and transfer the control software to the volatile memory of said numerical control device, wherein said external storage device stores the control software in the form of a plurality of modules divided individually for functional elements, and also stores module configuration data for providing information for combining the modules to construct the control software.

2. A numerical control system according to claim 1, wherein said nonvolatile memory of said numerical control device is stored with part of the control software of the numerical control device, besides said communication software, a remaining part of the control software stored in said external storage device.

3. A numerical control system according to claim 1, wherein said host computer is further provided with control software generating software for constructing control software proper to each numerical control device, and said host computer reads said modules from said external storage device in accordance with said control software generating software, constructs control software corresponding to each numerical control device in accordance with said modules, and transfer the control software to the volatile memory of each numerical control device.

4. A numerical control system according to claim 3, wherein said modules are stored in said external storage device without duplication.

5. A numerical control system according to claim 3, wherein the nonvolatile memory of one of said numerical control devices is stored with said control software generating software to be stored in the nonvolatile memory of said host computer.

6. An input setting method for control software for numerical control devices, comprising:
   (a) connecting one or more numerical control devices and a host computer using an information transmission line and loading communication software programs individually into nonvolatile memories in said numerical control device(s) and said host computer;
   (b) connecting an external nonvolatile memory to said information transmission line, storing said external nonvolatile memory with control software controlling a machine using said numerical control device(s), and storing a system configuration information storage file indicative of the correlation between the numerical control device(s) and the control software;
   (c) individually activating said communication software programs when the power supply is connected and transferring said control software corresponding to each numerical control device from said external nonvolatile memory to said host computer through said information transmission line in accordance with said system configuration information software, and storing the control software in the volatile memory of each numerical control device; and
   (d) causing the numerical control device(s) to analyze a read application program by the control software, thereby controlling each axis of the machine, wherein said control software is composed of two or more software modules, said storing of the control software includes storing the control software in the form of the software modules in said external nonvolatile memory, and said system configuration information storage file contains information to the effect that the software modules are combined into one control software corresponding to a specific numerical control device.

7. An input setting method for control software for numerical control devices according to claim 6, wherein said control software is divided between a first portion required in common for the driving control of various machines without regard to the types of the machines and a second portion, the remainder, associated with the driving control and proper to each individual machine, said first portion of the control software being previously stored in the nonvolatile memory in each numerical control device, said operation (b) includes storing said second portion of the control software in said external nonvolatile memory, and said operation (c) includes reading said second portion of the control software from said external nonvolatile memory when the power supply is connected and transferring the read second portion, along with said first portion of said control software stored in the nonvolatile memory of the numerical control device, to the volatile memory of the numerical control device to store with them.

8. An input setting method for control software for numerical control devices according to claim 8, wherein said first and second portions of said control software are composed of one or more combinations of software modules respectively, said nonvolatile memory of the numerical control device and said external nonvolatile memory are stored with the software modules of said first and second portions of the control software, respectively, and said system configuration information storage file contains information to the effect that the software modules are combined into one control software corresponding to a specific numerical control device.

9. An input setting method for control software for numerical control devices according to claim 6, wherein said control software to be transferred to the numerical control device can be modified by reloading said system configuration information storage file.

10. An input setting method for control software for numerical control devices according to claim 6, wherein said numerical control device is connected with a servo amplifier for driving a servomotor for each axis of each machine through a second information transmission line, said system configuration information storage file further contains data indicative of the correspondence between said servomotor and a command for the axis delivered from each numerical control device, said correspondence data for the axis command and the servomotor is also transferred when the software modules combined corresponding to the numerical control device are transferred to the numerical control device, and said numerical control device delivers the command for each axis to the corresponding servomotor in accordance with the correspondence data for the axis command and the servomotor.

11. An input setting method for control software for numerical control devices according to claim 6, wherein said numerical control device is connected with a servo circuit for controlling a servomotor for each axis of each machine through a second information transmission line, the servo circuit being connected with a servo amplifier, said system configuration information storage file further contains data indicative of the correspondence between said servomotor and a command for the axis delivered from each numerical control device, said correspondence data for the axis command and the servomotor is also transferred when the software modules combined corresponding to the numerical control device are transferred to the numerical control device, and said numerical control device delivers the command for each axis to the corresponding servo circuit in accordance with the correspondence data for the axis command and the servomotor.

12. An input setting method for control software for numerical control devices according to claim 6, wherein said external nonvolatile memory is further stored with a plurality of application softwares, said system configuration information storage file contains data indicative of the correspondence between the numerical control device and the application softwares, and each said responding application software is transferred from said host computer to each numerical control device.

13. An input setting method for control software for numerical control devices according to claim 13, wherein said host computer collects operating conditions for the numerical control device(s) and modifies the contents of said system configuration information storage file indicative of the combinations of said application softwares and software modules for the numerical control device(s) and the correspondence between the axis command and said servomotor delivered from each numerical control device so that the operating conditions of each numerical control device are optimized.

14. An input setting method for control software for numerical control devices according to claim 12, wherein said information transmission line is connected with a spare numerical control device in advance so that when an error signal is transmitted from the numerical control device in operation to said host computer or when the operation of the numerical control device is to be stopped for maintenance operation, said spare numerical control device is assigned in place of said numerical control device to be stopped, the contents of said system configuration information storage file are modified and set, and the data indicative of the stopped application softwares, combinations of the software modules and the correspondence between the axis command and said servomotor delivered from each numerical control device are transferred to the spare numerical control device, whereby the operation is continued by said spare numerical control device.

* * * * *

UNITED STATES PATENT AND TRADEMARK OFFICE
CERTIFICATE OF CORRECTION

PATENT NO. : 6,438,444 B1
DATED : August 20, 2002
INVENTOR(S) : Toru Mizuno et al.

It is certified that error appears in the above-identified patent and that said Letters Patent is hereby corrected as shown below:

Column 16,
Line 54, please change "8" to -- 6 --.

Column 18,
Line 9, please change "13" to -- 12 --.

Signed and Sealed this

Fifteenth Day of June, 2004

JON W. DUDAS
*Acting Director of the United States Patent and Trademark Office*